United States Patent
Wolf

(10) Patent No.: US 7,398,067 B2
(45) Date of Patent: Jul. 8, 2008

(54) MULTIPLE INTERMEDIATE FREQUENCIES RECEIVER AND A METHOD THEREOF

(75) Inventor: Guy Wolf, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 11/081,535

(22) Filed: Mar. 17, 2005

(65) Prior Publication Data

US 2006/0211398 A1    Sep. 21, 2006

(51) Int. Cl.
    *H04B 17/02* (2006.01)
(52) U.S. Cl. .......................... 455/137; 455/273
(58) Field of Classification Search .......... 455/101, 455/132, 137, 139, 272, 273, 276.1, 323, 455/324, 303, 304, 307, 504–506, 65; 375/347
    See application file for complete search history.

(56) References Cited

U.S. PATENT DOCUMENTS

| | | | |
|---|---|---|---|
| 7,020,182 B2 * | 3/2006 | Herve | 375/148 |
| 7,197,336 B2 * | 3/2007 | Paramesh et al. | 455/562.1 |
| 2001/0015999 A1 * | 8/2001 | Nam | 375/148 |
| 2006/0209978 A1 * | 9/2006 | Jungnickel et al. | 375/267 |
| 2007/0178870 A1 * | 8/2007 | Kerth | 455/313 |

* cited by examiner

*Primary Examiner*—Nguyen Vo
(74) *Attorney, Agent, or Firm*—Pearl Cohen Zedek Latzer LLP

(57) ABSTRACT

Embodiment of the invention provides a receiving device having an intermediate frequency section to produce first and second intermediate frequency signals based on first and second received radio frequency signals, such that said intermediate frequency signals are combinable to be jointly processed. The first intermediate frequency signal is antipodal to the second intermediate frequency signal. Embodiment of the invention further provides at least one common sub-circuit to process at least one combined intermediate frequency signal which is based on components of first and second intermediate frequency signals.

29 Claims, 6 Drawing Sheets

+

+

=

=

MULTIPLE INTERMEDIATE FREQUENCIES RECEIVER AND A METHOD THEREOF

BACKGROUND OF THE INVENTION

In a wireless communication system, multiple antennas may be used to receive multiple incoming signals that may originate from the same communication site and may carry the same source information. The signals, which may be transmitted at substantially the same radio frequencies (RF), may travel through diverse physical wireless media, for example, different geometric paths, and may experience different degradation in signal quality. The degradation may be attributed to noise introduced to the signals, e.g., from the wireless media en route to the respective destinations, for example, respective receiving antennas. Using multiple communication channels, e.g., using separate receiving antennas and signal processing circuitries, may improve the quality of communication between two communicating sites. The receiving site may select a signal based on desired criteria, e.g., using known methods for antenna diversity, for example, based on the highest signal-to-noise ratio (SNR) among the multiple received signals.

A communication device, which is capable of communicating over multiple communication channels, known as path diversification, may include multiple signal processing circuits to process multiple received signals, respectively.

BRIEF DESCRIPTION OF THE DRAWINGS

The invention will be understood and appreciated more fully from the following detailed description of embodiments of the invention, taken in conjunction with the accompanying drawings of which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods and procedures have not been described in detail so as not to obscure the embodiments of the invention.

It should be understood that embodiments of the invention may be used in a variety of applications. Although the invention is not limited in this respect, embodiments of the invention may be used in conjunction with many apparatuses, for example, a wireless GSM base station and/or a wireless GSM handset as in a GSM cellular system, a cellular phone, a wireless phone, a receiver, a transceiver, a transmitter-receiver, a wireless communication device, a wireless mobile unit (MU), a wireless access point (AP), a processor, a controller, a modem, a Personal Digital Assistant (PDA) device, a Personal Communication Systems (PCS) device, a PDA device which incorporates a wireless communication device, or the like.

In the following description, various figures, diagrams, flowcharts, models, and descriptions are presented as different means to effectively convey the substances and illustrate different embodiments of the invention that are proposed in this application. It shall be understood by those skilled in the art that they are provided merely as exemplary samples, and shall not be constructed as limitation to the invention.

Figure 1:
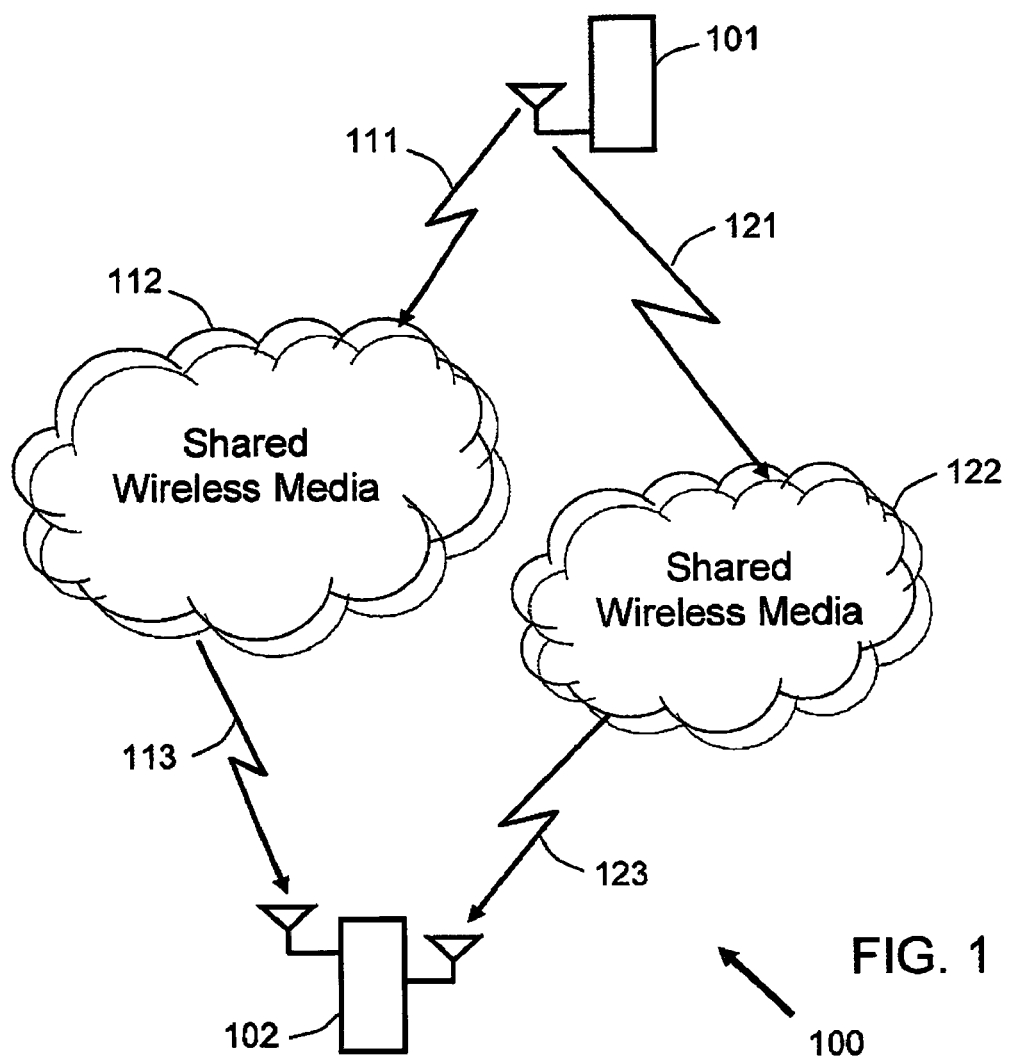
FIG. 1 is a schematic diagram of a wireless communication system including one or more communication devices able to communicate over multiple communication channels according to exemplary embodiments of the invention.

FIG. 1 schematically illustrates a wireless communication system 100 including a plurality of communication devices able to communicate over multiple communication channels according to exemplary embodiments of the invention.

System 100 may include a plurality of wireless communication devices, e.g., devices 101 and 102, located at different geographical sites. The communication devices of system 100 may include one or more mobile stations and/or one or more stationary stations. In some embodiments, for example, device 101 may be a GSM handset and device 102 may be a GSM base station, or vice versa, although the invention is not limited in this respect. In other embodiments, device 101 may be a GSM base station and device 102 may also be a GSM base station, although the invention is not limited in this respect either.

The invention is described below in a context wherein device 102 receives signals transmitted by device 101 over multiple channels, however the invention is not limited in this respect. Device 101 may transmit radio frequency (RF) signals 111 and 121, which may both correspond to the same signal originating from the same antenna, to be carried over media 112 and 122, respectively. Media 112 and 122 may be any wireless media capable of carrying and/or relaying RF signals 111 and 121, and may introduce distortion and/or noise and/or interference, e.g., from one or more other communication devices, to RF signals 111 and 121. The source information contained in signals 111 and 121 may be received by device 102 in the form of RF signals 113 and 123, respectively, which may be influenced by properties of wireless media 112 and 122, respectively.

The route of signals 111 and 113 via medium 112 may be part of a first physical wireless communication channel, which may be referred to herein as a "first communication channel". The route of signals 121 and 123 via medium 122 may be part of a second physical wireless communication channel, which may be referred to herein as a "second communication channel". It will be appreciated by persons skilled in the art that device 101 may communicate with device 102 through one or more other communication channels, in addition to or instead of the first and second channels defined above. Device 101 may communicate with device 102 via multiple channels for various reasons, for example, to enable transmission path diversification, as is known in the art.

It will be appreciated by persons skilled in the art that although device 102 is shown as a receiving device and device 101 as a transmitting device in FIG. 1, the invention is not limited in this respect. For example, device 101 may also receive multiple communication channels via multiple receiving antennas, and device 102 may also transmit signals via a transmitting antenna.

Communication device 102, referred to herein also as "receiving device", may receive multiple RF signals, e.g., signals 113 and 123, e.g., via carriers of substantially the same radio frequency. As is known in the art, if multiple channels are in effect, the quality of communication between device 101 and device 102 may be improved by, for example, device 102 selecting, as an active channel, the best channel out of multiple channels originating from device 101. For example, the quality of communication between device 101 and 102, which may be measured by, for example, bit-error-rate (BER), may be enhanced by selecting among multiple received signals a received signal having the highest signal-to-noise ratio (SNR) as an active receiving channel. According to exemplary embodiments of the invention, part of the circuitry inside the receiving device, for example, receiving device 102, and part of the functionality of the receiving circuitry, may be utilized to process multiple intermediate frequency signals derived from the multiple channels, eliminating at least some duplication in hardware, thereby reducing the size of the device and the cost to the device manufacture.

Figure 2:
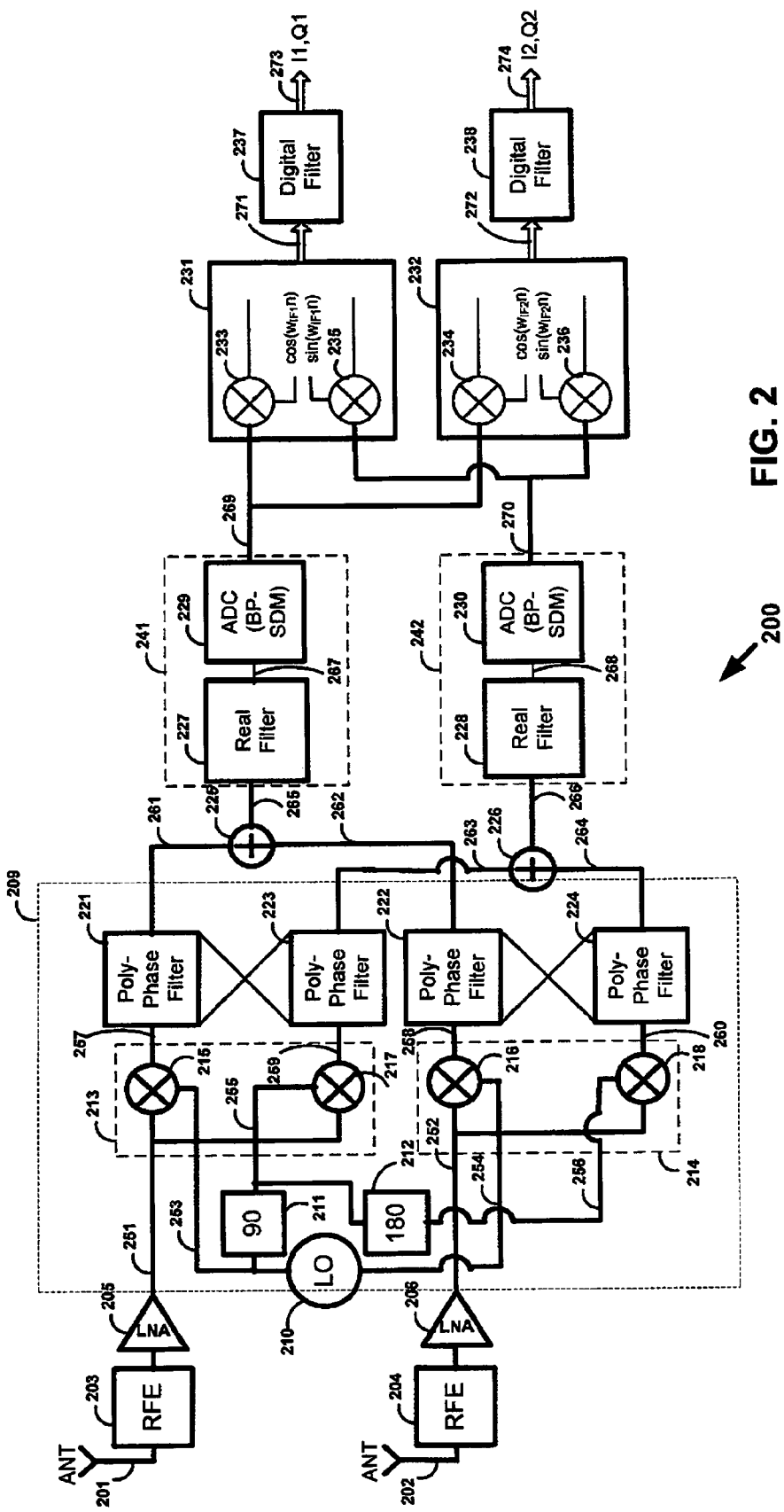
FIG. 2 is a schematic illustration of part of a communication device including a dual intermediate frequency (DIF) receiver according to exemplary embodiments of the invention.
Figure 3A:
FIG. 3 is a simplified illustration of signal spectrums at various parts of a DIF receiver according to exemplary embodiments of the invention.
Figure 3B:
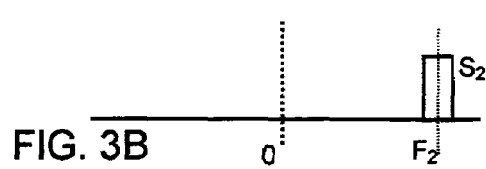
Figure 3C:
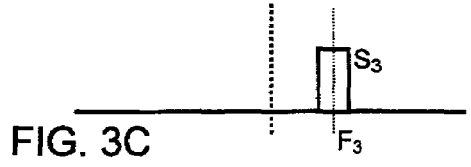
Figure 3D:
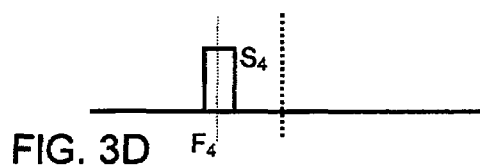
Figure 3E:
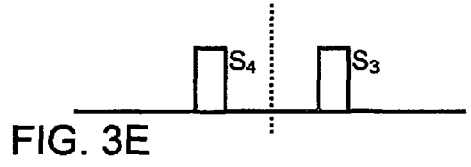
Figure 3F:
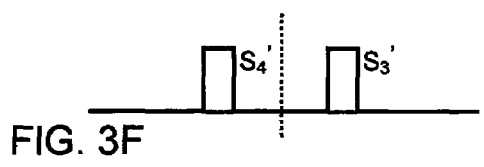
Figure 3G:
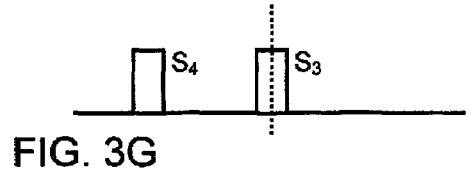
Figure 3H:
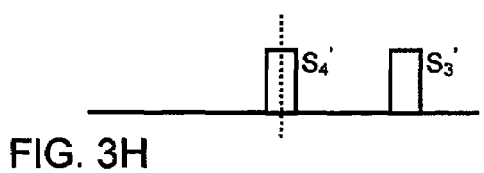
Figure 3I:
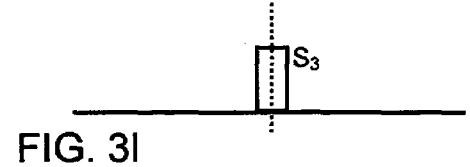
Figure 3J:
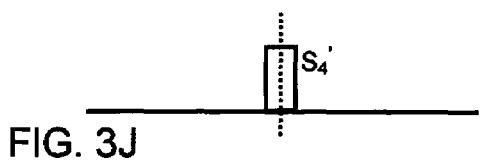
Figure 4A:
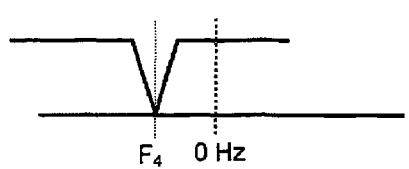
FIG. 4 is a simplified illustration of exemplary frequency responses of parts of a DIF receiver according to exemplary embodiments of the invention.
Figure 4B:
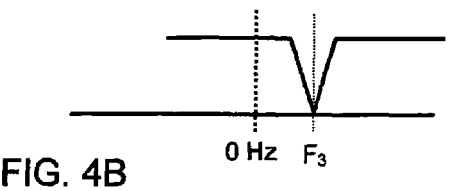
Figure 4C:
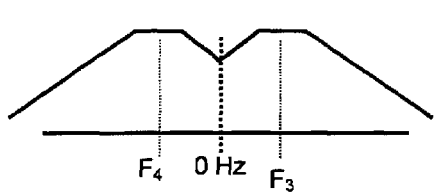
Figure 4D:
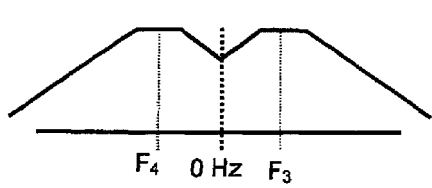
Figure 4E:
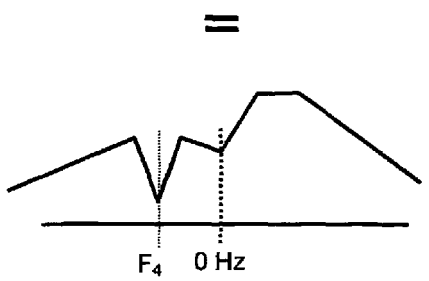
Figure 4F:
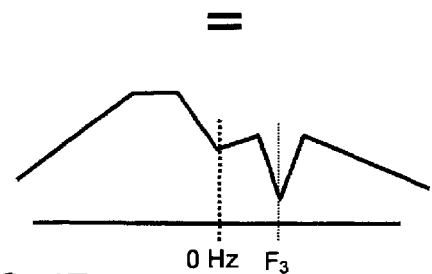

FIG. 2 schematically illustrates a DIF receiver 200 of a communication device, for example, receiving device 102 of FIG. 1 according to exemplary embodiments of the invention. DIF receiver 200 may be associated with two or more antennas 201 and 202 able to receive two or more respective RF signals over two or more respective communication channels. Receiver 200 may convert the received RF signals into two intermediate frequency (IF) signals and process the IF signals as described in detail below. It will be appreciated by persons skilled in the art that, alternative embodiments of the present invention may include devices and/or systems employing more than two antennas to receive more than two RF signals over more than two communication channels, and circuitry to process the received RF signals using more than two intermediate frequencies.

Signals 113 and 123 as described above with reference to FIG. 1 may both carry source information originating from the same communication device, e.g., device 101 (FIG. 1). Signals 113 and 123 may be received by antennas (ANT) 201 and 202, respectively, and may be detected by two radio-frequency front-end (RFE) modules, 203 and 204, associated with antennas 201 and 202, respectively. The detected signals may subsequently enter two low-noise amplifiers (LNA), 205 and 206, respectively, which may amplify the signals to produce amplified signals 251 and 252, respectively. Signals 251 and 252 may have carrier frequencies $F_1$ and $F_2$, respectively (diagrams 301 and 302 in FIG. 3). In some exemplary embodiments of the invention, signals 251 and 252 received via antennas 201 and 202 may both have substantially the same carrier frequency, i.e., $F_1$ may be equal to $F_2$. Signals 251 and 252 may subsequently enter an intermediate frequency section 209, which may convert the signals into intermediate frequency signals, as described in detail below, for further processing. IF section 209 may include a local oscillator 210, two phase shifters 211 and 212, and modules 213 and 214, which may include quadrature down converters. In some embodiments, IF section 209 may also include poly-phase filters 221, 222, 223, and 224. The operation of elements within IF section 209 is described in details below.

Modules 213 and 214 may down convert the RF frequencies of signals 251 and 252 into two, respective, intermediate frequency signals. Modules 213 and 214 may mix an input RF signal with two local reference signals, respectively, thereby to produce two respective IF signals including an in-phase component ("I-component") and a quadrature component ("Q-component"), as described in more detail below.

Local oscillator 210 associated with quadrature down converters 213 and 214 may generate a first reference signal 253, whose frequency may be offset by a fixed amount, for example, 600 kHz, below the frequency of the received RF signals, e.g., signals 251 and 252. Local oscillator 210 may generate a second reference signal 254 that may be the same as first reference signal 253. A third reference signal 255 may be produced, for example, by phase-shifting reference signal 253, e.g., by 90-degrees, using phase shifter 211. A fourth reference signal 256 may be produced, for example, by phase-shifting reference signal 255 by 180-degree, e.g., using phase shifter 212.

A mixer 215 in module 213 may mix RF signal 251 with reference signal 253 to produce a first I-component 257. A mixer 217 in module 213 may mix RF signal 251 with reference signal 255 to produce a first Q-component 259. A mixer 216 in module 214 may mix RF signal 252 with reference signal 254 to produce a second I-component 258. A mixer 218 in module 214 may mix RF signal 252 with reference signal 256 to produce a second Q-component 260.

First I-component 257 may have a signal spectrum centered at a first IF frequency, $F_3$ (diagram 303 in FIG. 3), for example, 600 kHz, or any other desired value. I-component 257 may also contain an image signal spectrum. According to exemplary embodiments of the invention, a filter, for example, poly-phase filter 221, may reject the image signal spectrum. The filtering function of poly-phase filter 221 may be referred to herein as "image rejection filtering", as is known in the art. Poly-phase filter 221 may be implemented, for example, in the form of a band-stop filter or a low-pass filter. Poly-phase filter 221 may produce a first filtered I-component 261.

Second I-component 258 may have a signal spectrum centered at a second IF frequency $F_4$ (diagram 304 in FIG. 3) According to exemplary embodiments of the invention, second IF frequency $F_4$ may be antipodal to the first IF frequency $F_3$, i.e., $F_4$ may be equal to $-F_3$. I-component 258 may also contain an image signal spectrum. According to exemplary embodiments of the invention, a filter, for example, poly-phase filter 222, may perform image rejection filtering to reject the image signal spectrum. Similar to poly-phase filter 221, poly-phase filter 222 may be implemented, for example, in the form of a band-stop filter or a low-pass filter. Poly-phase filter 222 may produce a second filtered I-component 262.

According to exemplary embodiments of the invention, first Q-component 259 may have a signal spectrum centered at IF frequency $F_3$, similar to I-component 257, and an associated image signal spectrum centered at $-F_3$. A poly-phase filter 223 may perform image rejection filtering to reject the image signal spectrum, thereby to produce a first filtered Q-component 263 from Q-component 259. According to exemplary embodiments of the invention, second Q-component 260 may have a signal spectrum centered at IF frequency $F_4$, similar to I-component 258, and an associated image signal spectrum centered at $-F_4$. A poly-phase filter 224 may perform image rejection filtering to reject the image signal spectrum, thereby to produce a second filtered Q-component 264 from Q-component 260. Poly-phase filter 223 may be of the same type as poly-phase filter 221, and poly-phase filter 224 may be of the same type as poly-phase filter 222.

According to exemplary embodiments of the invention, a combiner 225 may combine the first and second filtered I-components 261 and 262 produced by poly-phase filters 221 and 222, respectively, thereby to produce a combined in-phase intermediate frequency signal 265. Combiner 225 may include an adder, which may sum the values of signals 261 and 262 and/or may produce an output value related to a combination of signals 261 and 262. According to exemplary embodiments of the invention, a common sub-circuit 241 may process signal 265 that includes I-components derived from signals received from both channels, e.g., signals 251 and 252. Common sub-circuit 241 may include a filter 227 and an analog-to-digital converter (ADC) 229. Filter 227 may filter combined in-phase signal 265 to reject high-frequency components, e.g., frequency components that are higher than half of the sampling rate of ADC 229, for anti-alias purposes, as is known in the art. Filter 227 may be an analog filter and may include, for example, a Chebychev filter. In one embodiment, filters 221 and 222 may include band-stop filters and filter 227 may include a fourth order real filter. In another embodiment, filters 221 and 222 may include low-pass filters and filter 227 may include a third order real filter. However, the invention is not limited in this respect. Real filter 227 may produce a first filtered combined in-phase signal 267.

According to exemplary embodiments of the invention, a combiner 226, e.g., an adder, may combine first and second filtered Q-components 263 and 264 produced by poly-phase filters 223 and 224, respectively, to produce a combined quadrature intermediate frequency signal 266. According to exemplary embodiments of the invention, a common sub-circuit 242 may process signal 266 that includes Q-components derived from signals received from both channels, e.g., signals 251 and 252. Common sub-circuit 242 may include a filter 228 and an ADC 230. Filter 228 may filter combined quadrature signal 266 to reject high-frequency components for anti-alias purposes, as is known in the art. Similar to filter 227, filter 228 may be a real filter, for example, a Chebychev filter. In one embodiment, filters 223 and 224 may include band-stop filters and filter 228 may include a fourth order real filter. In another embodiment, filters 223 and 224 may include low-pass filters and filter 228 may include a third order real filter. However, the invention is not limited in this respect. Real filter 228 may produce a second filtered combined quadrature signal 268 from input signal 266.

Analog-to-digital converters (ADC) 229 and 230, as shown in FIG. 2, may convert input signals 267 and 268, respectively, from analog format to digital format. ADCs 229 and 230 may include, for example, Band-Pass Sigma-Delta Modulators (BP-SDM) but the invention is not limited in this respect. ADCs 229 and 230 may produce a first digital signal 269 and a second digital signal 270, respectively.

According to exemplary embodiments of the invention, first digital signal 269 and second digital signal 270 may be received by a digital down converter 231. Digital down converter 231 may operate at intermediate frequency $F_3$ and may include mixers 233 and 235 to mix input signals, e.g., signals 269 and 270, with local oscillating signals, thereby to produce an output signal, e.g., a first base-band digital signal 271. A digital filter 237 may subsequently filter base-band digital signal 271 to produce a first filtered base-band digital output signal 273, which may include a first I-component, denoted $I_1$, and a first Q-component, denoted $Q_1$.

First and second digital signals 269 and 270 may also be received by a digital down converter 232. Digital down converter 232 may operate at intermediate frequency $F_4$, which may be equal to $-F_3$. Digital down converter 232 may include mixers 234 and 236 to mix input signals, e.g., signals 269 and 270, with local oscillating signals, thereby to produce an output signal, e.g., a second base-band digital signal 272. A digital filter 238 may subsequently filter base-band digital signal 272 to produce a second filtered base-band digital output signal 274, which may include a second I-component, denoted $I_2$, and a second Q-Component, denoted $Q_2$. $I_1$ and $Q_1$, as discussed above, and $I_2$ and $Q_2$, correspond to signals 251 and 252, respectively, received via antennas 201 and 202, respectively, and relate to the first and second communication channels, respectively.

FIG. 3 schematically illustrates frequency spectrums of signals at various parts of a DIF receiver according to exemplary embodiments of the invention, for example, DIF receiver 200 of FIG. 2. For simplicity of illustration, the frequency spectrums shown in FIG. 3 include only frequency spectrums relating to the information to be received. It will be appreciated that the frequency spectrums at various parts of receiver circuitry may include additional frequency components, e.g., frequency components resulting from interference and/or noise, which may affect the carrier signal as it progresses through the wireless media. It will also be appreciated that some of the diagrams in FIG. 3 may use identical symbols to represent the same type of component, e.g., I-components and/or Q-components. However the use of the same symbols in different diagrams should not be an indication that the shapes of corresponding frequency spectrums are the same. The schematic frequency spectrums shown in FIG. 3 are described in detail below with reference to corresponding parts of DIF receiver 200 in FIG. 2.

Diagram 301 illustrates an exemplary frequency spectrum of signal 251 at the output of low-noise amplifier 205. Signal 251 may have a frequency spectrum $S_1$ centered at RF frequency $F_1$. Diagram 303 illustrates an exemplary frequency spectrum $S_3$ of first filtered I-component 261 centered at IF frequency $F_3$ at the output of filter 221. An image spectrum of $S_3$ centered at $-F_3$ is filtered out by filter 221. It will be appreciated by persons skilled in the art that the shape of the frequency spectrum of first filtered Q-component 263, at the output of filter 223, may be similar to that shown in diagram 303, but may contain the Q-component of frequency spectrum $S_1$.

Diagram 302 illustrates an exemplary frequency spectrum of signal 252 at the output of low-noise amplifier 206. Signal 252 may have a frequency spectrum $S_2$ centered at RF frequency $F_2$, which may be equal to $F_1$ ($F_2=F_1$) according to some embodiments of the invention. Diagram 304 illustrates an exemplary frequency spectrum $S_4$ of second filtered I-component 262 centered at IF frequency $F_4$ at the output of filter 222. According to exemplary embodiments of the invention, $F_4$ may be antipodal to $F_3$, that is, $F_4$ may be equal to $-F_3$. An image spectrum of $S_4$, e.g., centered at $-F_4$, may be filtered out by filter 222. It will be appreciated by persons skilled in the art that the shape of the frequency spectrum of second filtered Q-component 264, at the output of filter 224, may be similar to diagram 304 shown in FIG. 3, but may contain the Q-component of frequency spectrum $S_2$.

Diagrams 305 and 306 illustrate exemplary frequency spectrums of signals 265 and 266 respectively. According to exemplary embodiments of the invention, the frequency spectrum of combined in-phase signal 265 may correspond to a sum of first and second I-components, 257 and 258, after being filtered by poly-phase filters 221 and 222, respectively. Therefore, diagram 305 shows the frequency spectrum of combined in-phase signal 265, which may correspond to, for example, a superposition of the spectra shown in diagrams 303 and 304. Diagram 305 shows that the combined in-phase signal 265 may have a generally symmetric frequency spectrum.

According to exemplary embodiments of the invention, the frequency spectrum of combined quadrature signal 266 may be a sum of first and second Q-components, 259 and 260, filtered by poly-phase filters 223 and 224, respectively. As described above, first and second Q-components 259 and 260 may have frequency spectrums, denoted herein as $S_3'$ and $S_4'$, respectively, similar to those shown in diagrams 303 and 304. Therefore, the frequency spectrum of combined quadrature signal 266 may correspond, for example, to the frequency spectrum illustrated in diagram 306, which may be similar to the spectrum shown in diagram 305 and may be generally symmetric.

Diagram 307 illustrates an exemplary frequency spectrum of an I-component of first base-band digital signal 271 (FIG. 2), which is produced after combined in-phase signal 265 is filtered by real filter 227, converted into digital signal by ADC 229, and digitally down converted to base-band by mixer 233 of module 231. It will be appreciated by persons skilled in the art that first base-band digital signal 271 may also have a Q-component, similarly produced from combined quadrature signal 266. The frequency spectrum of the Q-component of base-band digital signal 271 may be similar to that of the I-component, and is not shown in diagram 307.

The frequency spectrum in diagram 307 may contain the I-component $S_3$ of base-band digital signal 271 and some frequency components $S_4$ that may be related to second communication channel, e.g., second I-component 258 as described above. Frequency components $S_4$ may be located at a frequency equal to $F_4$-$F_3$. Digital filter 237 may reject frequency components $S_4$ and pass I-component $S_3$. The frequency spectrum shown in diagram 309 represents base-band signal $S_3$, which may be the I-component $I_1$ of first filtered base-band digital output signal 273. Frequency spectrum of the Q-component $Q_1$, which may be analogous to I-component $I_1$, is not shown in the drawings.

Diagram 308 illustrates an exemplary frequency spectrum of a Q-component of second base-band digital signal 272 (FIG. 2). This Q-component may be produced after combined quadrature signal 266 is filtered by real filter 228, converted into digital signal by ADC 230, and digitally down converted to base-band by mixer 234 of module 232. The frequency spectrum in diagram 308 contains the Q-component $S_4'$ of base-band digital signal 272 and some frequency components $S_3'$ located at a frequency equal to $F_3$-$F_4$. Digital filter 238 may reject frequency components $S_3'$ and pass Q-component $S_4'$. The frequency spectrum shown in diagram 310 represents base-band signal $S_4'$, which may be the Q-component $Q_2$ of second filtered base-band digital output signal 274. Frequency spectrum of the I-component $I_2$, which may be analogous to Q-component $Q_2$, is not shown in the drawing.

FIG. 4 schematically illustrates frequency response curves of parts of a DIF receiver according to exemplary embodiments of the invention, for example, DIF receiver 200 as shown in FIG. 2. The curve in diagram 401 may represent an exemplary frequency response of poly-phase filter 221 (FIG. 2), and may be the frequency response of a band-stop filter, for example, a –600 kHz band-stop filter as described above. The frequency response curve of poly-phase filter 223 (FIG. 2), which is not shown in the drawings, may be generally similar to the frequency response curve of poly-phase filter 221.

Diagram 402 illustrates an exemplary frequency response curve of poly-phase filter 222 (FIG. 2). The curve may represent the frequency response of a band-stop filter, for example, a 600 kHz band-stop filter as described above. The frequency response curve of poly-phase filter 224 (FIG. 2) is not shown in the drawings, but may be generally similar to the frequency response curve of poly-phase filter 222.

Diagram 403 illustrates an exemplary frequency response of curve real filter 227, which may be centered at an IF frequency $F_3$, for example, 600 kHz, as described above. When real filter 227 and poly-phase filter, 221 are cascaded, a combined frequency response of part of DIF receiver 200 including filters 221 and 227 is illustrated in diagram 405. It will be appreciated by persons skilled in the art that combined frequency response, as shown in diagram 405, may provide image rejection around IF frequency $F_4$, and noise rejection and anti-alias filtering around IF frequency $F_3$. It will further be appreciated by persons skilled in the art that a combined frequency response of part of DIF receiver 200 including filters 222 and 227 may be similar to that shown in diagram 405, and therefore is not shown here.

Diagram 404 illustrates an exemplary frequency response curve of real filter 228 that may have similar frequency response to real filter 227 as shown in diagram 403. A combined frequency response of part of DIF receiver 200 including filters 223 and 228 is illustrated in diagram 406. It will be appreciated by persons skilled in the art that combined frequency response, as shown in diagram 406, may provide image rejection around $F_3$, as well as noise rejection and anti-alias filtering at $F_4$. It will also be appreciated by persons skilled in the art that a combined frequency response of part of DIF receiver 200 including filters 224 and 228 may be similar to that shown in diagram 406, and therefore is not shown here.

Figure 5:
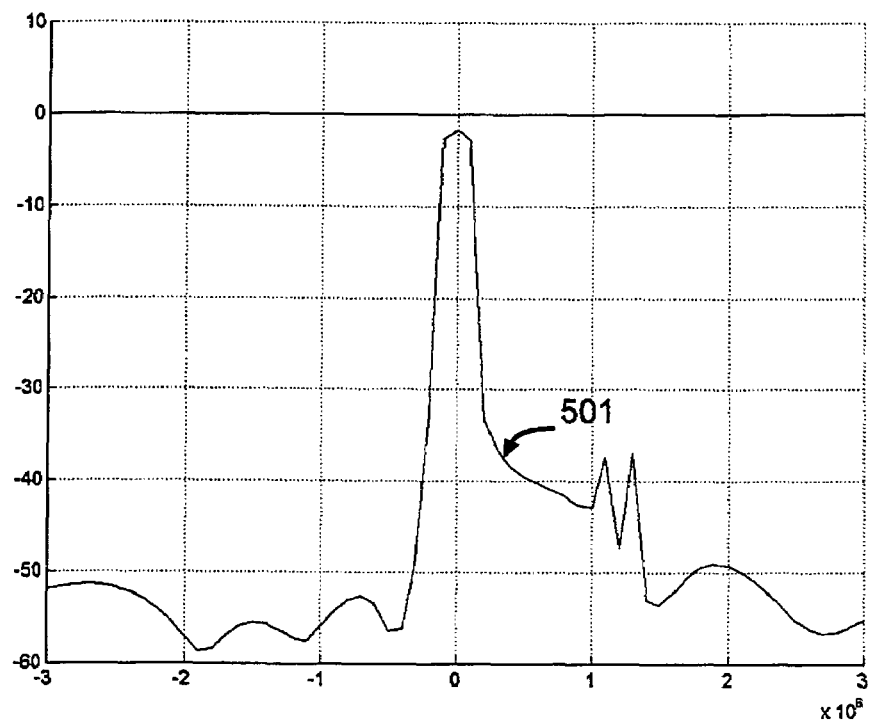
FIG. 5 is a schematic illustration of simulated frequency responses of parts of a DIF receiver according to exemplary embodiments of the invention.
Figure 5:
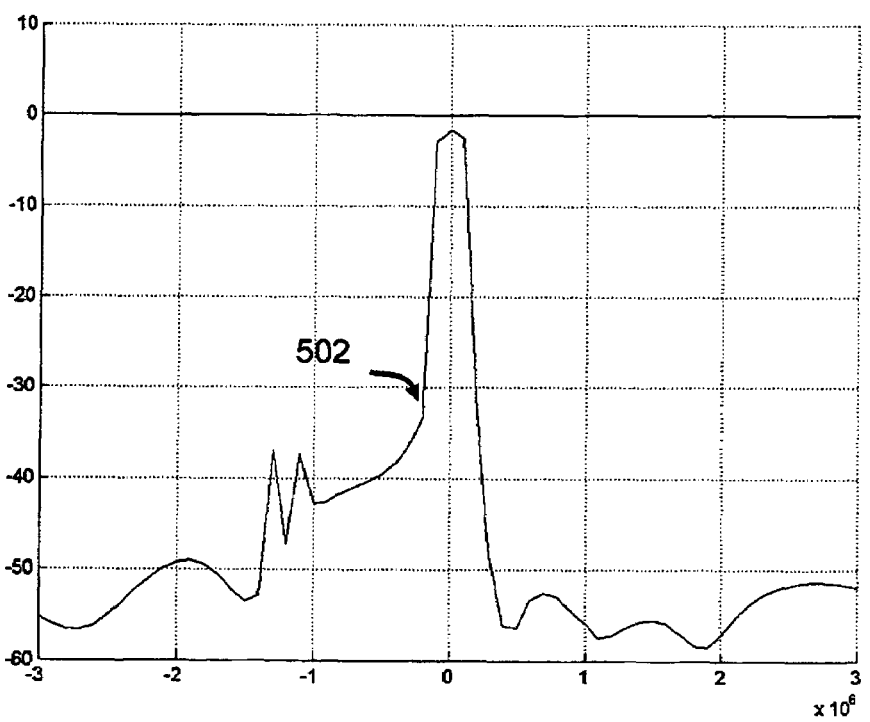

FIG. 5 schematically illustrates diagrams of simulated frequency responses of a DIF receiver according to exemplary embodiments of the invention, for example, DIF receiver 200 of FIG. 2. Diagram 501 illustrates the frequency response of a signal path from antenna 201, via poly-phase filter 221 and real filter 227, to digital filter 237. The frequency response diagram in diagram 501 shows output power as a function of a frequency offset of the carrier frequency. An asymmetric response with respect to the carrier frequency, which is denoted 0 Hz value at the center of diagram 501 for simplicity, may be due to, for example, spectrum leakage, and/or gain and phase imbalance along the path, e.g., from antenna 201 to digital filter 237, etc. Diagram 502 illustrates the frequency response of a signal path from antenna 202, via poly-phase filter 223 and real filter 228, to digital filter 238. The simulated frequency response curve in diagram 502 is offset by the carrier frequency as in diagram 501. A person skilled in the art will appreciate that the simulated frequency responses shown in diagrams 501 and 502 both demonstrate that signal channels including a poly-phase filter and a real filter may provide effective anti-alias filtering and noise rejection of signals 257 and 259, respectively.

Figure 6:
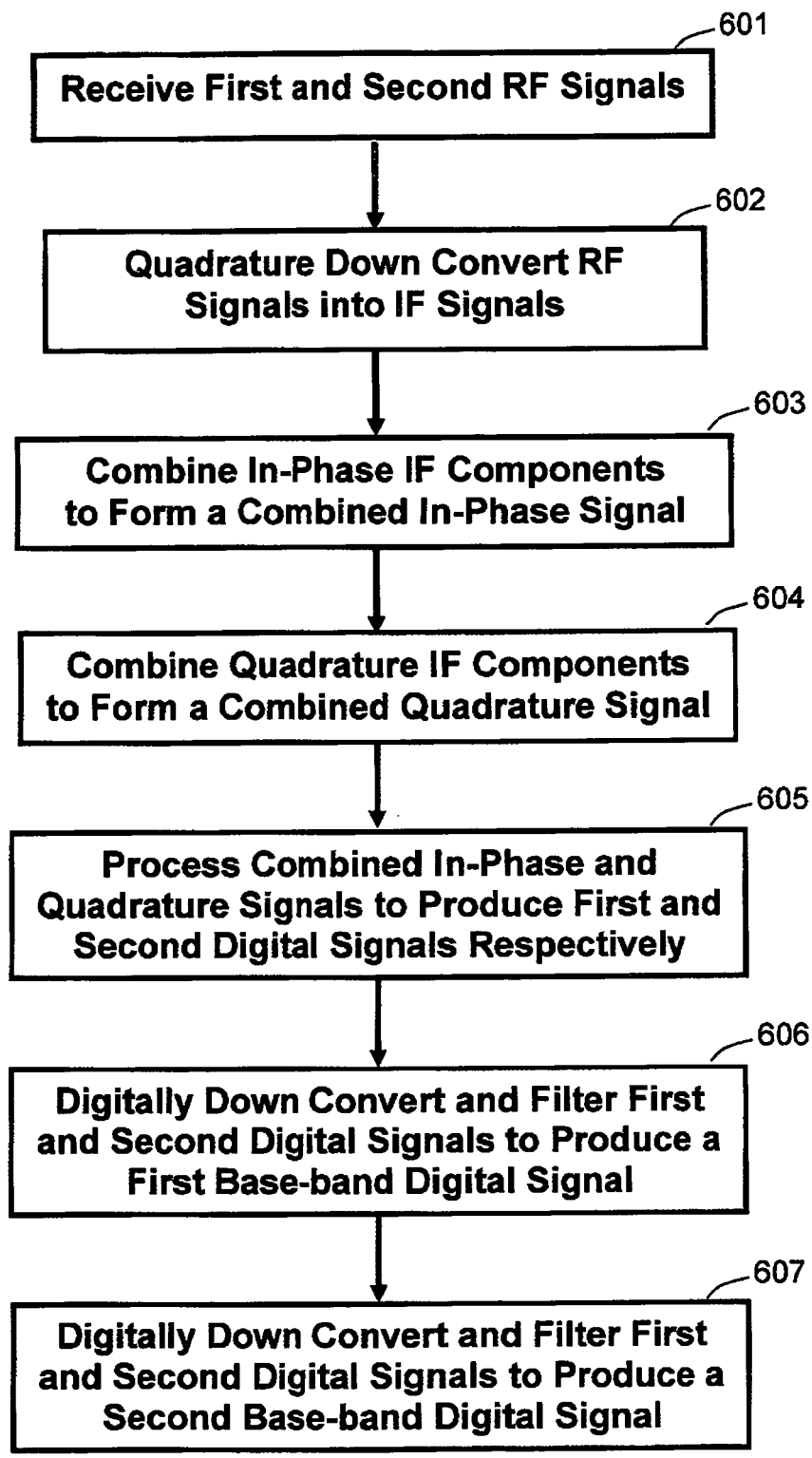
FIG. 6 is a schematic flowchart of a method of processing multiple received signals according to exemplary embodiments of the invention.

FIG. 6 schematically illustrates a flow chart of a method of receiving signals over dual channels according to exemplary embodiments of the invention. As indicated at box 601, the method may begin by receiving multiple signals, e.g., first and second signals 113 and 123 (FIG. 1) via first and second channels, by respective antennas, e.g., antennas 201 and 202, which may be associated with respective radio-frequency front end modules, e.g., modules 203 and 204 (FIG. 2).

The received RF signals may be quadrature down converted, as indicated at box 602, into intermediate frequency in-phase and quadrature components, e.g., I-components 257 and 258 and Q-components 259 and 260. As indicated at box 603, I-components 257 and 258 may be combined to form a combined in-phase signal 265, e.g., after filtering the I-components by respective poly-phase filters 221 and 222. Similarly, as indicated at box 604, Q-components 259 and 260 may be combined to form a combined quadrature signal 266, e.g., after filtering the Q-components by respective polyphase filters 223 and 224.

As indicated at box 605, combined in-phase signal 265 may be processed to produce a first digital signal 269. The processing may include filtering interfering noise by a real filter 227 and converting signal 265 from analog format to digital format by ADC 229. Similarly, combined quadrature signal 266 may be processed to produce a second digital signal 270. The processing may include filtering interfering noise by a real filter 228 and converting signal 266 from analog format to digital format by ADC 230.

As indicated at box 606 and 607, both first and second digital signals 269 and 270 may be down converted by a first digital down converter, e.g., digital down converter 231, and filtered by a digital filter, e.g., digital filter 237, to produce a first base-band digital signal, e.g., signal 273, which may relate to a signal received by antenna 201 via the first channel, e.g. signal 113 (FIG. 1). Similarly, both first and second digital signals 269 and 270 be down converted by a second digital down converter, e.g., digital down converter 232, and filtered by a digital filter, e.g., digital filter 238, to produce a second base-band digital signal, e.g., signal 274, which may relate to a signal received by antenna 202 via the second channel, e.g., signal 123 (FIG. 1).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An apparatus comprising:
   a receiver having
     an intermediate frequency section to produce first and second intermediate frequency signals based on first and second received radio frequency signals and first, second and third reference signals, such that said intermediate frequency signals are combinable to be jointly processed;
   a local oscillator to generate the first reference signal;
   a first phase-shifter to generate the second reference signal based on the first reference signal; and
   a second phase-shifter to generate the third reference signal based on the second reference signal.

2. The apparatus of claim 1, wherein said first intermediate frequency signal is antipodal to said second intermediate frequency signal.

3. The apparatus of claim 1, wherein the intermediate frequency section comprises:
   a first quadrature down converter to produce said first intermediate frequency signal based on said first received radio frequency signal and the first and the second reference signals; and
   a second quadrature down converter to produce said second intermediate frequency signal based on said second received radio frequency signal, said first reference signal, and the third reference signal.

4. The apparatus of claim 1, comprising:
   at least one combiner to combine components of said first and second intermediate frequency signals to produce a combined intermediate frequency signal; and
   at least one common sub-circuit to process said combined intermediate frequency signal.

5. The apparatus of claim 4, wherein said combiner comprises an adder to add said components of said first and second intermediate frequency signals to produce said combined intermediate frequency signal.

6. The apparatus of claim 4, wherein said components comprise in-phase components of said first and second intermediate frequency signals.

7. The apparatus of claim 4, wherein said components comprise quadrature components of said first and second intermediate frequency signals.

8. The apparatus of claim 5, wherein said common sub-circuit comprises a filter to reject predetermined frequency components of said combined intermediate frequency signal to produce a filtered combined signal, and an analog-to-digital converter to convert said filtered combined signal into a corresponding digital signal.

9. The apparatus of claim 8, comprising at least one digital down converter to convert said digital signal into a base-band digital signal.

10. A method comprising:
    generating a first reference signal;
    generating a second reference signal based on the first reference signal; and
    generating a third reference signal based on the second reference signal,
    producing first and second intermediate frequency signals based on first and second received radio frequency signals and the first, the second and the third reference signals; and
    processing a combined signal which is based on components of said first and second intermediate frequency signals.

11. The method of claim 10, wherein said first intermediate frequency signal is antipodal to said second intermediate frequency signal.

12. The method of claim 10, comprising:
    quadrature down converting said first received radio frequency signal to said first intermediate frequency signal by mixing said first received radio frequency signal with the first and the second reference signals; and
    quadrature down converting said second received radio frequency signal to said second intermediate frequency signal by mixing said second received radio frequency signal with said first reference signal and the third reference signal.

13. The method of claim 10, wherein processing comprises:
    rejecting predetermined frequency components of said combined signal to produce a filtered combined signal; and
    converting said filtered combined signal into a corresponding digital signal.

14. The method of claim 13, comprising digitally down converting said digital signal into a base-band digital signal.

15. The method of claim 10, comprising:
    combining said components of said firs and second intermediate frequency signals to produce said combined signal.

16. The method of claim 15, wherein combining comprises:
    adding in-phase components of said first and second intermediate frequency signals to produce a first said combined signal; and
    adding quadrature components of said first and second intermediate frequency signals to produce a second said combined signal.

17. A wireless communication device, comprising:
    first and second antennas to receive first and second, respective, radio frequency signals;

a receiver having an intermediate frequency section to produce first and second intermediate frequency signals based on said first and second received radio frequency signals and first, second and third reference signals, such that said intermediate frequency signals are combinable to be jointly processed;

a local oscillator to generate the first reference signal;

a first phase-shifter to generate the second reference signal based on the first reference signal; and a second phase-shifter to generate the third reference signal based on the second reference signal.

18. The wireless communication device of claim 17, wherein said first intermediate frequency signal is antipodal to said second intermediate frequency signal.

19. The wireless communication device of claim 17, wherein said receiver comprises a combiner to combine components of said first and second intermediate frequency signals to produce a combined intermediate frequency signal and a common sub-circuit to process said combined intermediate frequency signal.

20. The wireless communication device of claim 19, wherein said components comprise in-phase components of said first and second intermediate frequency signals.

21. The wireless communication device of claim 19, wherein said components comprise quadrature components of said first and second intermediate frequency signals.

22. The wireless communication device of claim 19, wherein said common sub-circuit comprises a filter to reject predetermined frequency components of said combined intermediate frequency signal to produce a filtered combined signal and an analog-to-digital converter to convert said filtered combined signal into a corresponding digital signal.

23. The wireless communication device of claim 17, comprising:

a first quadrature down converter to produce said first intermediate frequency signal based on said first received radio frequency signal and the first and the second reference signals; and a second quadrature down converter to produce said second intermediate frequency signal based on said second received radio frequency signal and said first reference signal and the third reference signal.

24. A wireless communication system comprising:

at least one wireless communication station having first and second antennas to receive first and second, respective radio frequency signals, and a receiver having an intermediate frequency section to produce first and second intermediate frequency signals based on said first and second received radio frequency signals and first, second and third reference signals, such that said intermediate frequency signals are combinable to be jointly processed;

a local oscillator to generate the first reference signal;

a first phase-shifter to generate the second reference signal based on the first reference signal; and a second phase-shifter to generate the third reference signal based on the second reference signal.

25. The wireless communication system of claim 24, further comprising:

a wireless communication station to transmit said first and second radio frequency signals.

26. The wireless communication system of claim 24, wherein said first and second radio frequency signals are received over first and second, respective, communication channels.

27. The wireless communication system of claim 24, wherein said first intermediate frequency signal is antipodal to said second intermediate frequency signal.

28. The wireless communication system of claim 24, wherein said receiver comprises a combiner to combine components of said first and second intermediate frequency signals to produce a combined intermediate frequency signal and a common sub-circuit to process said combined intermediate frequency signal.

29. The wireless communication system of claim 28, wherein said common sub-circuit comprises a filter to reject predetermined frequency components of said combined signal to produce a filtered combined signal and an analog-to-digital converter to convert said filtered combined signal into a corresponding digital signal.

* * * * *